United States Patent
Wolf

(10) Patent No.: US 10,263,780 B2
(45) Date of Patent: Apr. 16, 2019

(54) ENCRYPTION AND AUTHENTICATION METHOD AND APPARATUS

(71) Applicant: Thomas Wolf, München (DE)

(72) Inventor: Thomas Wolf, München (DE)

( * ) Notice: Subject to any disclaimer, the term of this patent is extended or adjusted under 35 U.S.C. 154(b) by 514 days.

(21) Appl. No.: 14/933,279

(22) Filed: Nov. 5, 2015

(65) Prior Publication Data
US 2016/0241400 A1    Aug. 18, 2016

(30) Foreign Application Priority Data
Feb. 13, 2015    (EP) .................................... 15154982

(51) Int. Cl.
*H04L 9/00* (2006.01)
*H04L 9/08* (2006.01)
(Continued)

(52) U.S. Cl.
CPC ............ *H04L 9/3226* (2013.01); *G06F 21/62* (2013.01); *H04L 9/002* (2013.01); *H04L 9/0869* (2013.01)

(58) Field of Classification Search
CPC ........ H04L 9/3226; H04L 9/002; G06F 21/62
(Continued)

(56) References Cited

U.S. PATENT DOCUMENTS

| | | | | |
|---|---|---|---|---|
| 2006/0034453 | A1* | 2/2006 | Liu | H04L 9/0643 380/28 |
| 2012/0207300 | A1* | 8/2012 | Karroumi | H04L 9/0836 380/44 |

FOREIGN PATENT DOCUMENTS

| | | |
|---|---|---|
| EP | 0 963 636 B1 | 6/2005 |
| EP | 2 487 828 A1 | 8/2012 |

(Continued)

OTHER PUBLICATIONS

Wikipedia: "Initialization vector"; Oct. 20, 2014; https://en.wikipedia.org/wiki/Initialization_vector.
(Continued)

*Primary Examiner* — Eleni A Shiferaw
*Assistant Examiner* — Angela R Holmes
(74) *Attorney, Agent, or Firm* — Bryan W. Bockhop; Bockhop Intellectual Property Law, LLC

(57) ABSTRACT

The invention discloses a method for encrypting and/authenticating, comprising the following steps:
  Sending a request for a first bit combination or character combination as a first sub key (102);
  storing said first bit combination or character combination in the memory (104);
  generating a second bit combination or character combination as a second sub key (106), wherein the second bit combination or character combination is a random or pseudo random pattern; and
  combining said first sub key and second sub key to a key (108);
further comprising at least one of the following steps:
  encrypting the data with the key (110);
  using the key as an authentication password (112); and a method of decrypting and/or authenticating, comprising the following steps:
  sending a request for a first bit combination or character combination as a first sub key (202);
  storing said first bit combination or character combination in the memory (204);
  repeating the following steps until a key has been verified as valid:
  generating one by one a second bit combination or character combination as a second sub key (206),
(Continued)

wherein the second bit combination or character combination is one by one taken from the set of all possible second sub keys (208);
combining said first sub key and second sub key to a key (210);
verifying, whether the key is valid (212);
if said key has been verified as valid, decrypting the data with the key (214) and/or using the key an authentication password (216).

5 Claims, 3 Drawing Sheets

(51) Int. Cl.
*H04L 9/32* (2006.01)
*G06F 21/62* (2013.01)
(58) Field of Classification Search
USPC ........................................................ 713/183
See application file for complete search history.

(56) References Cited

FOREIGN PATENT DOCUMENTS

| | | |
|---|---|---|
| EP | 3057029 B1 | 1/2018 |
| WO | WO 02/05069 A2 | 1/2002 |

OTHER PUBLICATIONS

Beck et al.: "Practical Attacks Against WEP and WPA"; Mar. 16, 2009; WiSec '09; ACM.

European Patent Office, "Extended European Search Report" dated Aug. 7, 2015 (EESR in corresponding European Patent Application No. 15154982.1-1870).

European Patent Office, "Communication under Rule 71(3) EPC" Nov. 9, 2017 (Intention to Grant Patent in corresponding European Patent Application No. 15154982.1-1870).

\* cited by examiner

ENCRYPTION AND AUTHENTICATION METHOD AND APPARATUS

CROSS-REFERENCE TO RELATED APPLICATION(S)

This application claims the benefit of European Patent Application No. EP15154982.1, filed Feb. 13, 2015, the entirety of which is hereby incorporated herein by reference.

BACKGROUND OF THE INVENTION

1. Field of the Invention

The present invention relates to an improved encryption and authentication method and apparatus.

2. Description of the Related Art

In the prior art passwords are widely used for authenticating a user or a service on a computer. Passwords are also used for protecting archives, such as ZIP archives.

However, it is possible to bypass such password protection by simply testing an arbitrary number of bit combination or character combinations, also called brute forcing or simply forcing.

In the prior art of encryption several methods for authenticating an identity, for encrypting data, for generating checks sums and/or for generating hashes are available, wherein the security for not determining a used key is depending on the capabilities of the potential attackers. Many of these methods are considered by person skilled in the art to be secure against simply trying an arbitrary number of password patterns, often called brute forcing or forcing. Brute forcing or forcing tries to determine a password by trying all possible keys. Since the amount of keys that can be tested within a predetermined period can be very high by using modern computers or computer clusters, the evaluation, whether a key is safe or unsafe is determined by its length that may be evaluated by its length in bits. The performance of modern computers, supercomputers and computer clusters is so high that depending on the details of the used attack, the automatic testing of a very high number of keys may be achieved within a period that this accepted by the attacker. In other words, the safety of a key is higher the longer the information content in bits or its length is. A key that may be easily memorized by a human, particularly passwords, are often below a sufficient level of security.

In the prior art methods are known for to preventing testing different keys on a computer device, for example by introducing an idle time after entering a wrong key.

This reduces significantly the number of keys that can be tested within a predetermined period. Such methods can only be applied if the testing is done by a predetermined interface, such as a keyboard or a particular computer. An attack can circumvent the idle time if he uses a computer cluster for determining a password or can test an arbitrary number of passwords on his own computer system. Thereby, the number of keys to be tested within a predetermined period may be maximized. This is particularly true, if the attacker has physical access to the data archive or the computer.

In the prior art of encryption, methods are available to avoid circumvention of brute forcing algorithm complexity by appending a second sub key (called "salt") to the user key before the hashing algorithm is carried out, such eliminating the possibility to use pre-calculated hashing tables or other simplification methods.

It is an object of the present invention to provide a more secure encryption and authentication method and apparatus.

SUMMARY OF THE INVENTION

An inventive method for encrypting and/or authenticating comprises the step of sending a request for a first bit combination or character combination as a first sub key and storing the first bit combination or character combination in the memory. According to the present invention a second bit combination or character combination is generated as a second sub key, wherein the second bit combination or character combination is a random or pseudo random pattern. The first sub key and the second sub key are combined to a key. Data is encrypted with the key. The key may also be used as an authentication password to authenticate on a computer.

In the context of the present invention a computer is any device having a central processing unit and a memory, such as a smart phone, a tablet computer, a personal computer, a notebook, a laptop or the like. The authentication may also include an authentication at a service, such as a program running on a computer, for example on a remote computer.

The first sub key has a length of "a" bits and the second sub key has a length of "b" bits. Thus, for determining the first sub key $2a$ keys have to be tested. For determining the key including the first sub key and the second sub key $2a+b$ keys have to be tested as test stimuli. Thereby, the time for determining a password by brute forcing is significantly extended, which may hinder attackers to apply brute forcing.

The second sub key does not need to be known to the user. The first and/or second sub key needs to be known to the computer which requires authentication, and/or to a data archive, which is protected by a password or key, only as the result of an encrypting and/or hashing operation in order to verify the correctness of the combined key, not necessarily in unencrypted and/or unhashed form.

The method for decrypting and/or authenticating comprises the step of sending a request for a first bit combination or character combination as a first sub key and storing the first bit combination or character combination in the memory. According to the invention the step of generating a second bit combination or character combination as a possible second sub key of a plurality of second sub keys, wherein the second bit combination or character combination is selected from the set of all possible second sub keys, the step of combining the first sub key and the second sub key to a key and the step of verifying whether the key is valid are repeated until the key has been verified as valid. If the key has been verified as valid, the data is decrypted with the key and/or the key is used as an authentication password.

The decryption method generates a plurality of patterns as a second sub key for generating the key for decrypting data and/or for generating the authentication password. Thereby, the time required for decrypting data or determining the authentication password is increased. Such time increase may be acceptable, if the first sub key is known, since it is inputted by the user. However, if the first sub key is determined by brute forcing the time required for determining the key or password is significantly increased, since both the first sub key and the second sub key have to be determined by brute forcing. Thereby, determining the key or the password is less attractive for an attacker.

The step of verifying whether the key is valid may include attempting to decrypt the data and/or authenticating using the password. The method may try to decrypt an archive (e.g. ZIP archive) or authenticate using the password on a computer or a service.

The step of sending a request may comprise the step of sending a request to a user to enter the first sub key on a computer.

The step of combining the first sub key and the second sub key may include concatenating the first sub key and the second sub key, inserting the second sub key at an arbitrary position of the first sub key, inserting the first sub key at an arbitrary position of the second sub key, adding the second sub key at the end or beginning of the first sub key and/or interleaving the first sub key and the second sub key. Such concatenating, inserting, interleaving and adding may be performed on bit or character level. Thereby, even the security of a password that may be memorized by human beings may be increased significantly.

The second sub key may be of a different length than the first sub key, the second sub key may be shorter than the first sub key, for example. The step of encrypting may comprise the step of generating and storing a hash value based on the key. The step of decrypting may comprise the step of generating a hash value and comparing the generated hash value with a stored hash value.

The invention also discloses an encrypting and/or authentication apparatus comprising a requesting device adapted to request a first bit combination or character combination as a first sub key and a memory for storing the first bit combination or character combination. According to the invention a random or pseudo random generator is adapted to generate a second bit combination or character combination as a random or pseudo random second sub key. The encrypting apparatus further comprises a combiner adapted to combine the first sub key and the second sub key to a key. The key may be used by an encrypting device of the encrypting apparatus to encrypt the data with the key. The encrypting apparatus may also comprise a password generator adapted to generate a password based on the key.

The encrypting apparatus may be configured and used as discussed above with respect to the encrypting method.

The invention also discloses a decrypting and/or authentication apparatus that comprises a requesting device adapted to request a first bit combination or character combination as a first sub key and a memory for storing the first bit combination or character combination. The decrypting apparatus further comprises a key set generator adapted to select or generate one possible second sub key of a plurality of possible second sub keys. The decrypting apparatus may comprise a combiner adapted to combine the first sub key and the second sub key to a key. The decrypting apparatus further comprises a verifier adapted to verify, whether the key is valid. The decrypting apparatus further comprises a decrypting device adapted to decrypt the data with the key. The decrypting apparatus further comprises a controller adapted to control the key set generator, the combiner, the verifier and the decrypting device by instructing the key set generator to generate an arbitrary bit combination or character combination as a second sub key from the set of all possible second sub keys, instructing the combiner to combine the first sub key and the second sub key to a key, instructing the verifier to verify, whether the key is valid, and if the key has been verified as valid by the verifier, instructing the decrypting device to decrypt the data with the key and/or using the key as an authentication password.

The decrypting apparatus may be adapted and configured as discussed above with respect to the decrypting method.

The verifier may be adapted to decrypt the data with the key and/or to use the password to authenticate on a computer. The requesting device may be adapted to request a user to enter the first sub key, such as entering the first sub key on an input device.

The combiner may concatenate the first sub key and the second sub key, insert the second sub key at an arbitrary position of the first sub key, insert the first sub key at an arbitrary position of the second sub key, adding the second sub key at the end or beginning of the first sub key and/or interleaving the first and second sub key. Concatenating, inserting, adding and inserting may take place on bit level or character level.

The second sub key may be of a different length than the first sub key. The encrypting device may be adapted to generate a hash value based on the key. The decrypting device may be adapted to generate a hash value based on the key and to compare the hash value with a stored hash value.

The second sub key is an unknown part of the key. This second sub key is selected in a random manner or in a pseudo random manner being more or less similar to a random pattern. Further the length of the second sub key and accordingly its information content is to be selected such that the number of possible keys generated by combining the first sub key and the second sub key is so high that even by using a highly performant computer or computer cluster the time span for brute forcing the password or key is significantly increased. It is to be understood that the second sub key may have a length that does not overly reduce the usability for the user by a long idle time when authenticating on a computer or when decrypting an archive.

The encryption and decryption apparatus may be implemented by discrete components, such as integrated circuits and/or application specific circuits. The components of the encryption and decryption apparatus may also be implemented by a computer having a processor and a memory. The computer may be a general purpose computer, including mobile telephones, tablet computers, notebooks, personal computers, servers and the like.

The invention also discloses an apparatus for encrypting and decrypting data comprising the above components configured for encrypting an decrypting data.

The invention also discloses an authentication apparatus comprising the above components configured for authenticating.

The encrypting method and/or the decrypting method may be computer implemented methods.

The second sub key ("salt") according to prior art methods is published (open) in these methods to the authenticating or decrypting user or system, in contrast to this invention, where the second sub key does not to need to be published to the authenticating user or system, thus greatly increasing the difficulty of brute forcing the correct key. Methods using an additional "salt" sub key can be used in addition to this invention, but do not have to be used for the invention to work.

In the prior art of encryption, in connection with using a public second sub key ("salt"), the hashing procedure is sometimes repeated for a significant number of times in order to increase the complexity of the decryption or authentication step, thus increasing the time necessary to test each key. However, this method relies on the non-existence of a method for the attacker to simplify successive hash operations, which is not generally proven yet and hence disputed, in contrast to this invention, where not the complexity of the decryption or authentication step as such is increased, but the number of necessary independent decryption or authentication attempts, thus avoiding any possibility to simplify or shorten the decryption or authentication process as a whole by any mathematical simplification methods or algorithms on part of the attacker.

The encrypting method and/or the decrypting method may be implemented by a computer program product, such as instructions stored on a data carrier, such as a USB device, CD or DVD. The computer program product may also be instruction data that can be transmitted by a suitable network, such as the internet.

BRIEF DESCRIPTION OF THE FIGURES OF THE DRAWINGS

The invention is now explained by non-limiting exemplary embodiments with reference to the accompanying drawings, wherein.

DETAILED DESCRIPTION OF THE INVENTION

Figure 1:
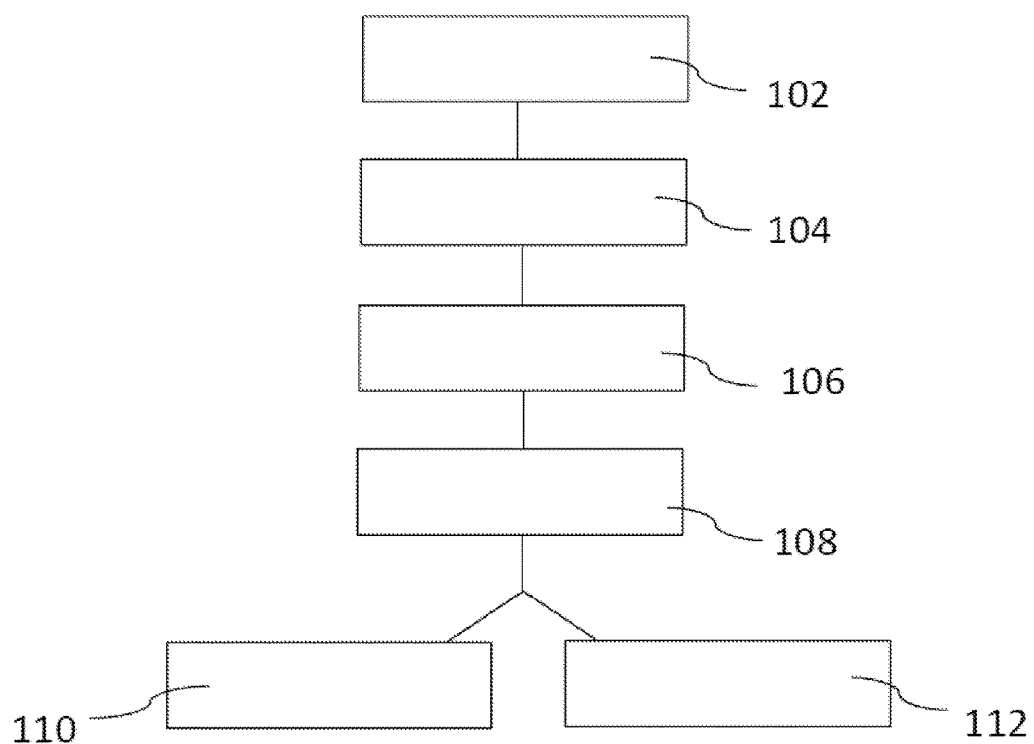
FIG. 1 is a flowchart of an encryption method according to the present invention.
Figure 2:
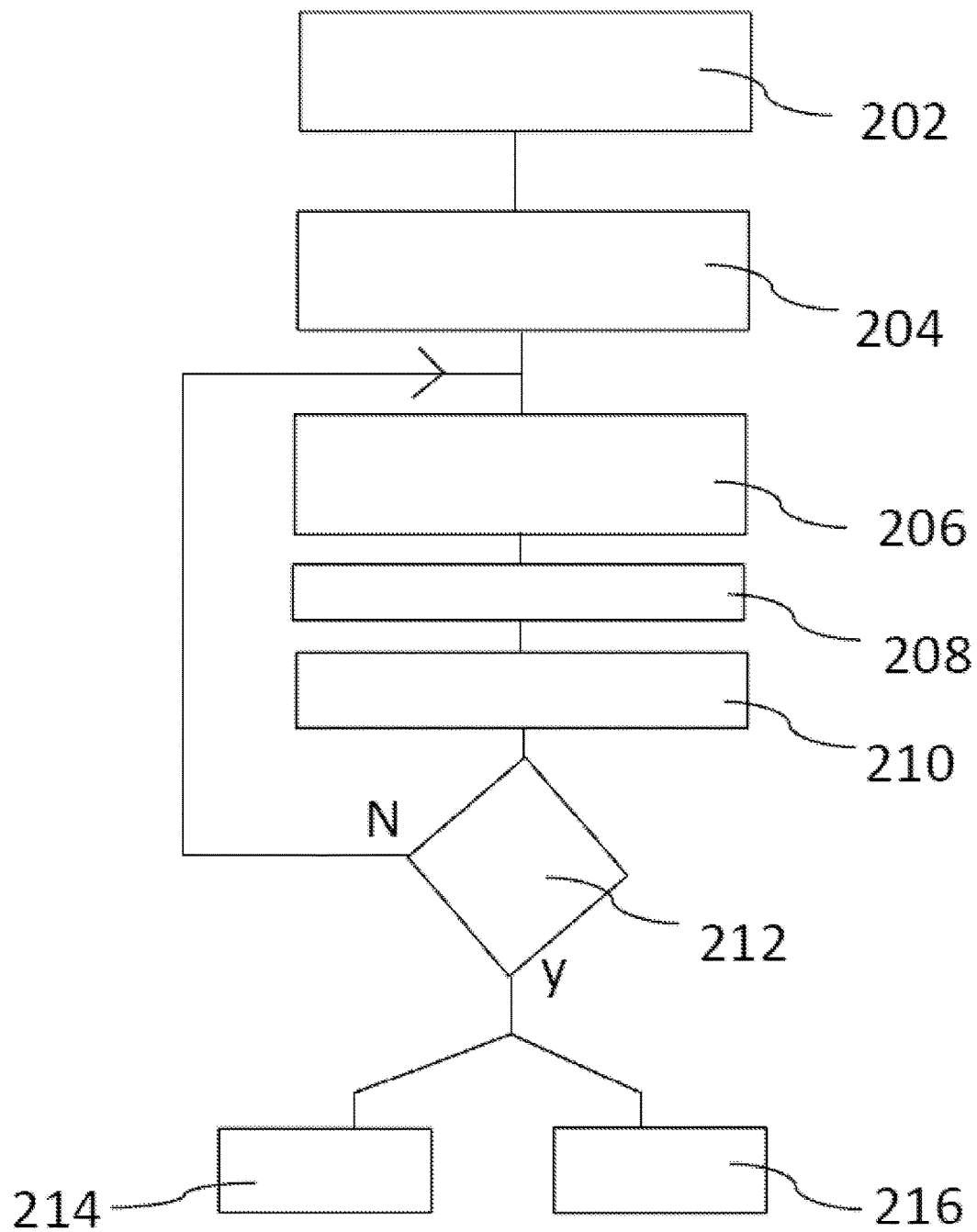
FIG. 2 is a flowchart of an decrypting method according to the present invention.
Figure 3:
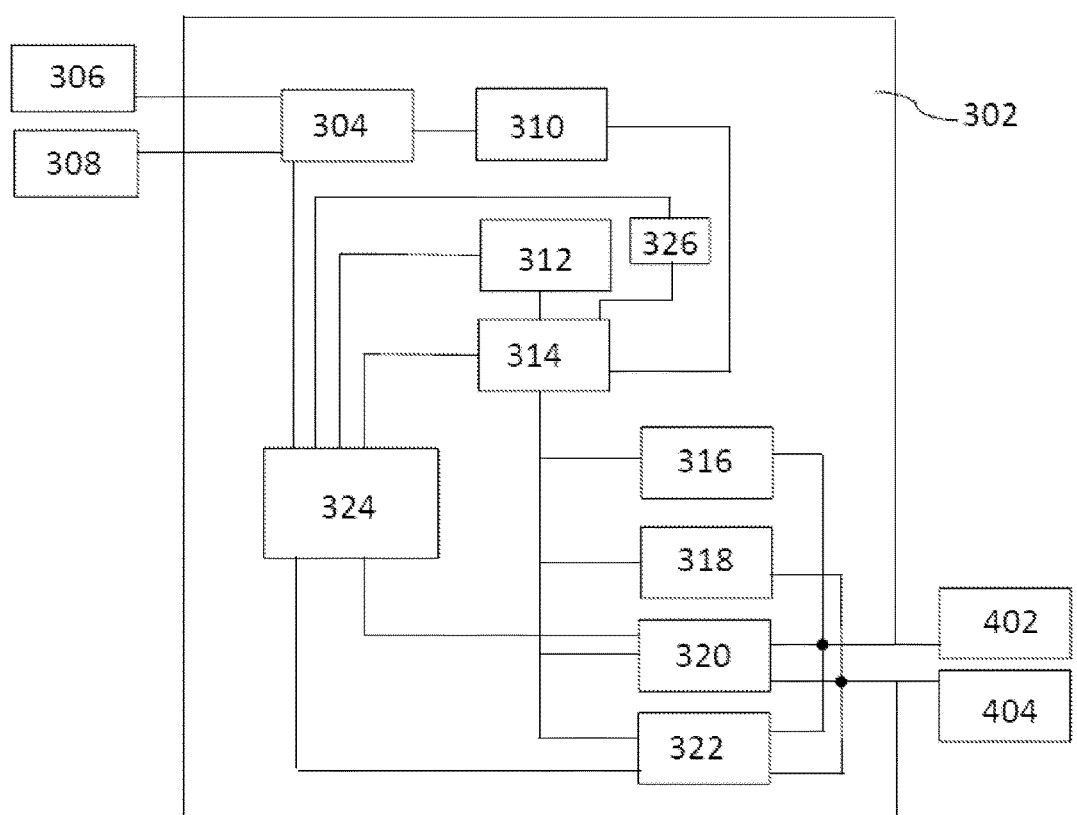
FIG. 3 is an apparatus according to the present invention.

The invention is now explained with reference to FIGS. 1 to 3.

A requesting device 304 sends a request 102 for a first bit combination or character combination as a first sub key to a user. The request is shown on an output device 308. The user enters the first bit combination or character combination as a first sub key on an input device 306. The first bit combination or character combination is stored in a memory 310. A random or pseudo random generator 312 generates a second bit combination or character combination as a second sub key 106, wherein the second bit combination or character combination is a random or pseudo random pattern. Random or pseudo random generators are known to the person skilled in the art and are not explained in further detail for the sake of brevity.

A combiner 314 combines the first sub key and the second sub key to a key 108. The combining may include concatenating the first sub key and the second sub key, inserting the second sub key at an arbitrary position of the first sub key, inserting the first sub key at an arbitrary position of the second sub key and adding the second sub key at the end or beginning of the first sub key and interleaving the first sub key and the second sub key. An encryption device 316 may encrypt data with the key 110 and may pass the data or to an external storage means or transmission means 402. A password generator 318 may enter the password as an authentication password at an external computer 404 or a service running on the same computer or a different computer 404.

The inventive encrypting and decrypting apparatus is also adapted to decrypt data or to provide a password for authenticating on a computer or at a service. The requesting device 304 sends a request for a first bit combination or character combination as a first sub key 202 to an output device 308. The user may enter the known sub key on the input device 306. The requesting device 304 stores the sub key in a memory 310. The encryption and decryption apparatus 302 further comprises a verifier for verifying, whether a key is valid, and a controller for controlling the key set generator 326, the combiner 314, and the verifier. The controller 324 instructs the key set generator 326 to generate a second bit combination or character combination as a second sub key 206, wherein the second bit combination or character combination is selected one by one from the set of possible second sub keys. Thereafter the controller 324 instructs the combiner 314 to combine the first sub key and the second sub key to a key 210. Then, the controller 324 instructs the verifier to verify, whether the key is valid 212. If the key has been verified as valid by the verifier 320, the controller 324 instructs a decrypting device 322 to decrypt the data with the key and/or to use the key as an authentication password at an external computer 404 or a service running on the same computer or a different computer 404. The verifier 320 may be connected to the external computer in order to verify, whether the password is valid, and/or an external device 402, on which the data stream to be decrypted is stored. It is to be understood that the data stream to be decrypted may also be stored in the encryption and decryption apparatus 302.

According to the present invention the security of the key is increased, since an attacker has to test an exponentially higher number of keys as compared with the prior art having no unknown second sub key. The higher security of the key is caused in that the attacker has to test a higher number of keys, called by the inventor of the present invention "forced forcing". Accordingly, the security of the key is increased by the factor which is determined by the time which is acceptable by the intended user to wait for generating the second sub key and verifying the same for authenticating and logging into a computer system. The user knows a bits of the first sub key. The inventive encryption and decryption method and apparatus generate b further bits provided in a second sub key. The first sub key and second sub key are combined by concatenating, inserting one key into the other adding one key at the beginning or end of the other key and interleaving the sub keys. This causes that an attacker has to test $2a+b$ keys. It is an advantage of the present invention that thereby a key memorized by a human user can provide effective protection against brute forcing.

What is claimed is:

1. Method for authenticating, comprising the following enrollments steps:
    sending a request for a first bit combination or character combination as a first sub key (102);
    storing said first bit combination or character combination in the memory (104);
    generating a second bit combination or character combination as a second sub key (106), wherein the second bit combination or character combination is a random or pseudo random pattern; and
    combining said first sub key and second sub key to a key (108); and
    further comprising the following step:
        using the key as an authentication password (112);
    further comprising the following verification steps for login:
        sending a request for a first bit or character combination as a first sub key (202);
        storing said first bit or character combination in the memory (204);
        repeating the following steps until a key has been verified as valid:
            generating one arbitrary second bit or character combination as a second sub key (206) from the set of all possible second sub keys (208);
            combining said first sub key and second sub key to the key (210);
            verifying, whether the key is valid (212), by authenticating using the password; and if said key has been verified as valid, using the key as an authentication password (216) on the computer;

wherein the steps of combining the first sub key and the second sub key includes at least one of the following steps:
- concatenating the first sub key and the second sub key;
- inserting the second sub key at an arbitrary position of the first sub key;
- inserting the first sub key at an arbitrary position of the second sub key;
- adding the second sub key at the end or beginning of the first sub key; and
- interleaving the first sub key and the second sub key.

2. Method for encrypting implemented by a computer, comprising the following steps for encrypting:
- sending a request for a first bit or character combination as a first sub key (102) for encrypting;
- storing said first bit or character combination in the memory (104);
- generating a second bit or character combination as a second sub key (106) for encrypting, wherein the second bit or character combination is a random or pseudo random pattern; and
- combining said first sub key for encrypting and second sub key for encrypting to a key (108) for encrypting; and further comprising at least one of the following steps:
- encrypting the data with the key (110) for encrypting;
- using the key for encrypting as an authentication password (112);

further comprising the following steps for decrypting:
- sending a request for a first bit or character combination as a first sub key (202) for decrypting;
- storing said first bit or character combination in the memory (204);
- repeating the following steps until a key for decrypting has been verified as valid:
  - generating one arbitrary second bit or character combination as a second sub key (206) for decrypting from the set of all possible second sub keys (208) for decrypting;
  - combining said first sub key and second sub key to the key (210) for decrypting;
  - verifying, whether the key for authenticating is valid (212) by attempting to decrypt the data; and
- if said key for decrypting has been verified as valid, decrypting the data with the key (214) for decrypting;

wherein the steps of combining the first sub key and the second sub key includes at least one of the following steps:
- concatenating the first sub key and the second sub key;
- inserting the second sub key at an arbitrary position of the first sub key;
- inserting the first sub key at an arbitrary position of the second sub key;
- adding the second sub key at the end or beginning of the first sub key; and
- interleaving the first sub key and the second sub key.

3. Method according to claim 2, wherein
- the step of encrypting comprises the step of generating and storing a hash value based on the key; and/or
- the step of decrypting comprises the step of generating a hash value and comparing the generated hash value with a stored hash value.

4. Method according to claim 3, wherein the step of sending a request comprises the step of sending a request to a user to enter the first sub key.

5. Method according to claim 4, wherein the second sub key is of a different length than the first sub key.

* * * * *